United States Patent Office 2,883,260
Patented Apr. 21, 1959

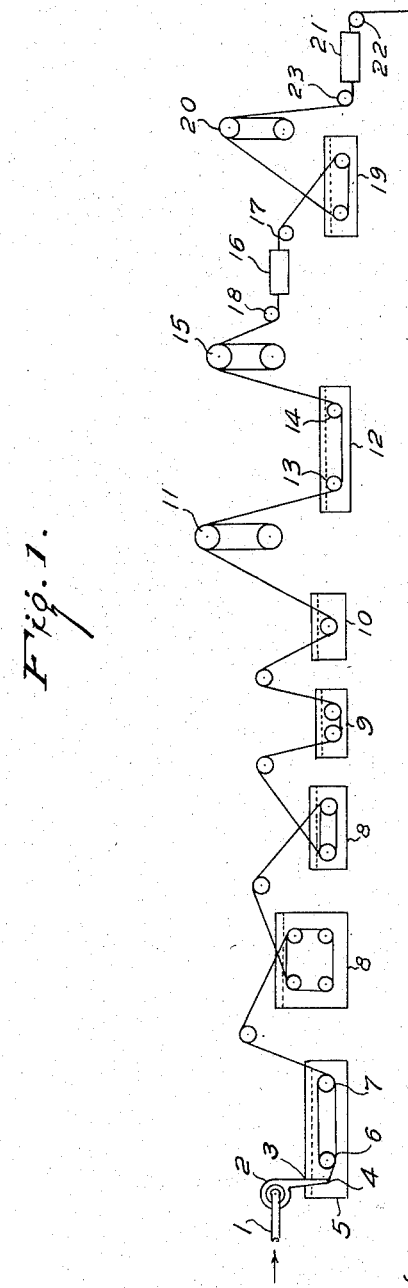

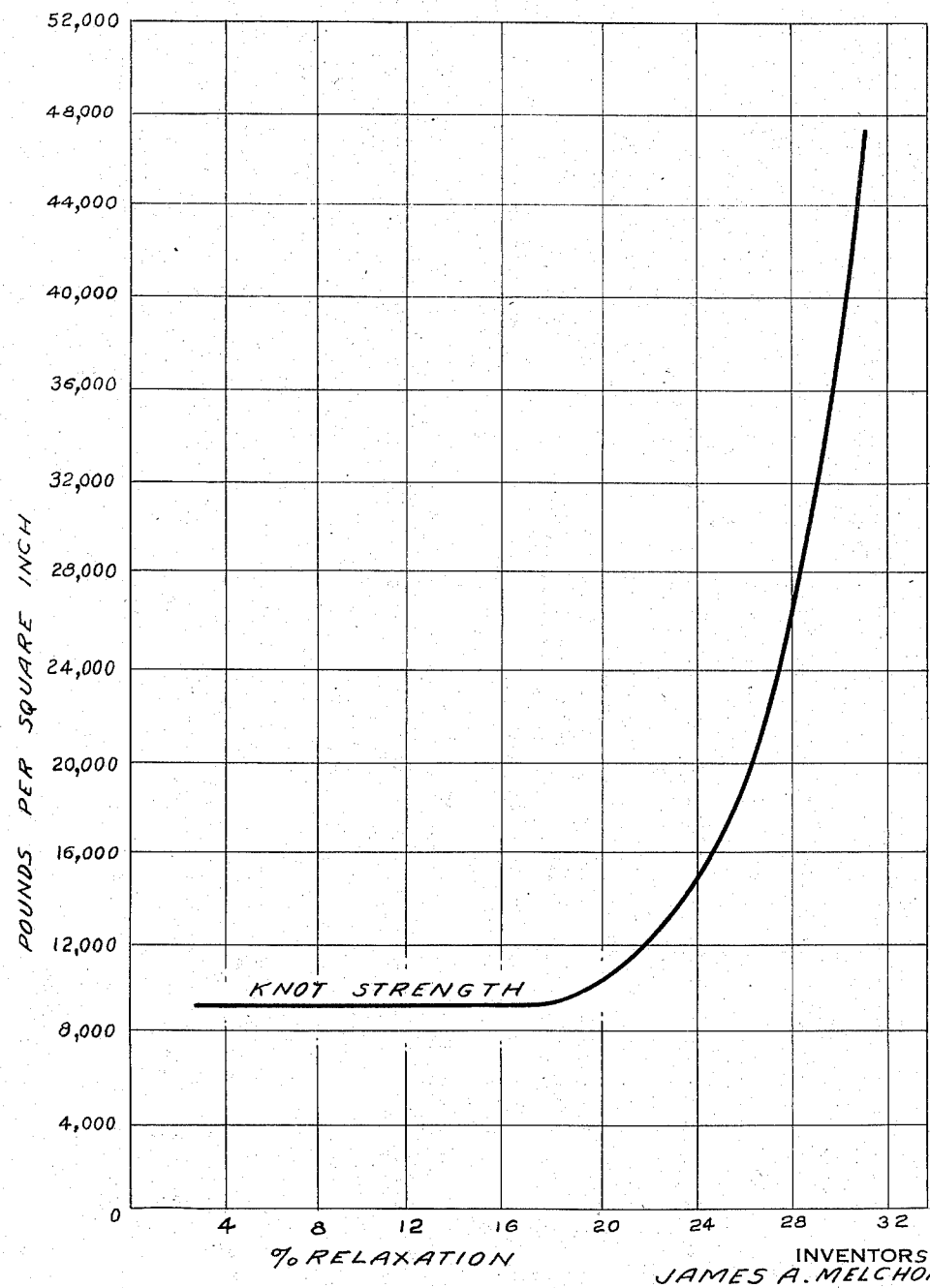

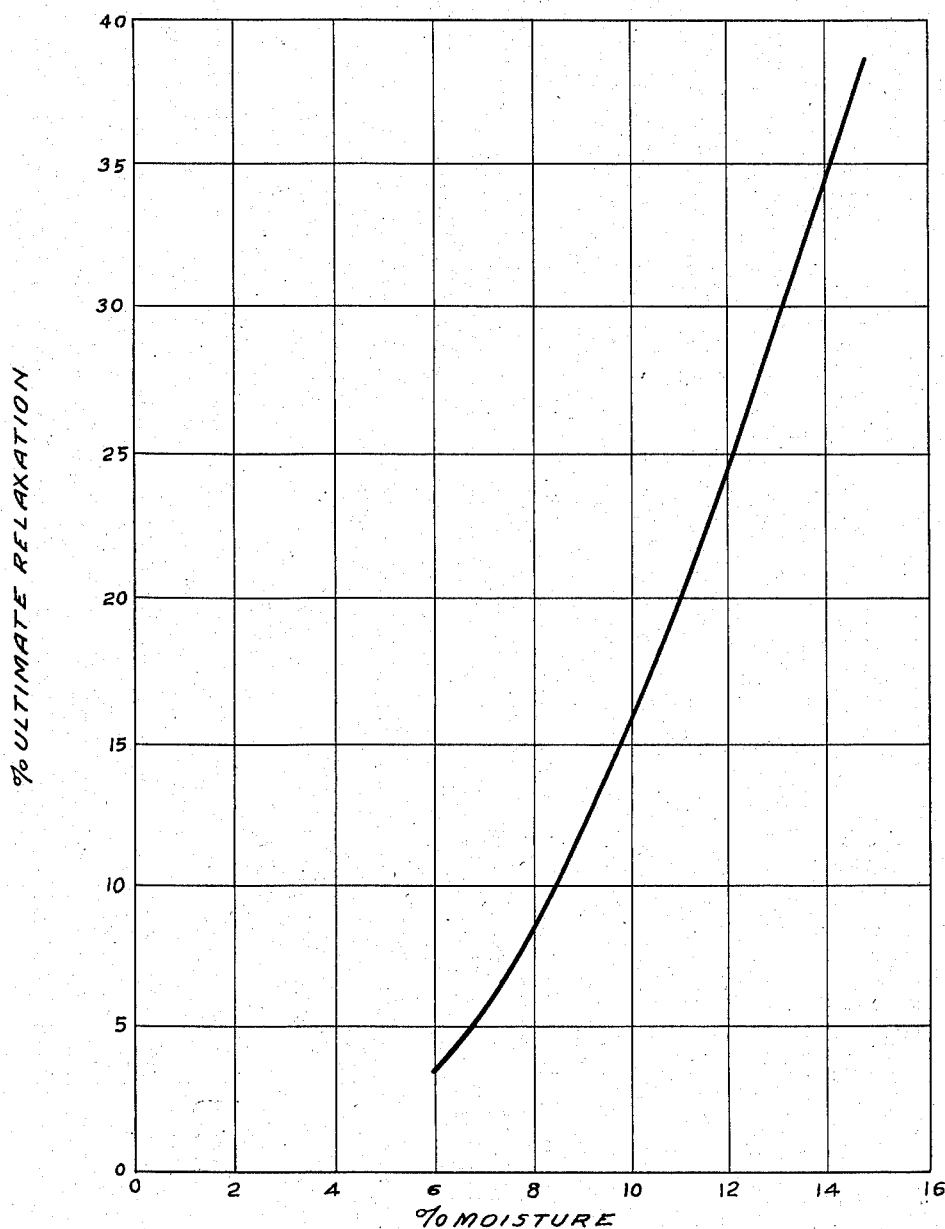

2,883,260

PRODUCTION OF MONOFILAMENT OF A POLYMER OR COPOLYMER OF ACRYLONITRILE

James A. Melchore, Darien, and Charles Laube, Stamford, Conn., assignors to American Cyanamid Company, New York, N.Y., a corporation of Maine Application September 21, 1953, Serial No. 381,318

14 Claims. (Cl. 18—54)

The present invention relates to the production of shaped synthetic resin articles and in particular to those comprising homopolymers and copolymers of acrylonitrile.

The process of the present invention is applicable to the manufacture by extrusion of a wide variety of shaped articles from polymerized acrylonitrile, which term is used as well as polymeric acrylonitrile herein to include both homo- and copolymers of acrylonitrile. It is especially adapted to the manufacture of monofilaments which are used for many purposes including the weaving of seat covers, upholstery fabrics, webbing, screen mesh and related materials, but may also be used in producing sheets, tubes, rods and other extrusion moldings of various shapes. Monofilaments are now available commercially in diameters ranging from 3 to 15 mils in diameter and composed of a number of synthetic resins including linear polyamides, caprolactam polymers and copolymers of vinylidene chloride with vinyl chloride. While these products have been generally successful, particularly in the automobile seat cover field, they have certain disadvantages. All are subject to appreciable shrinkage ranging from 1.3 to 10.4% upon exposure for 15 minutes to a temperature of 100° C. and this shrinkage is 3 to 6 times as great upon similar exposure at 170° C. Moreover, the generally good knot strength of these materials drops sharply with increasing diameter, and at least one of the resins is subject to a considerable loss in tensile strength upon a prolonged exposure to sunlight. In view of these factors, there is a continuing demand for improved monofilaments and other shaped articles manufactured from synthetic resins.

A number of methods have been suggested for relaxing or conditioning acrylonitrile fibers by heat treatments in the prior art but these have been found to be either ineffective or unsuitable for accomplishing the results obtainable with the present invention. The instant process is concerned with shaped articles prepared by the extrusion of a water-coagulable aqueous salt solution of polymerized acrylonitrile into an aqueous coagulating bath which is preferably maintained at a temperature below +10° C. and desirably between —15° and +5° C. followed by orientation by stretching at an elevated temperature as disclosed in U. S. Patents Nos. 2,558,730 and 2,558,733. For some unknown reason the relaxing treatment applied to dried multifilament strands in Cresswell et al. Patent No. 2,558,733 does not provide the best physical characteristics in a monofilament or other shaped articles having any cross-sectional dimension of at least 2 mils; yet, this patented process produces excellent physical properties including knot strength in filaments of small cross-section such as 0.5 mil diameter and ranging up to about 1.7 mils diameter.

The prior art also teaches that certain polyacrylonitrile multifilaments from a dimethylformamide solution into a heated coagulation medium under conditions such that no aqueous gel filament is formed, may be heat treated or relaxed under no tension in the yarn state by temperatures of at least 80° C. followed by a relatively longer aging period at the same temperature to produce good physical characteristics. While no doubt suitable for the multifilament yarn disclosed, this treatment of course possesses the disadvantage of requiring a long heat treatment for the maximum benefits and conveys no suggestion of the critical amount of relaxation and the critical relationship between moisture content and this relaxation in the case of filaments coagulated as aquagels.

It is an object of the invention to provide an improved process for the manufacture of shaped articles containing polymerized acrylonitrile.

Another object of the invention is to provide an improved process for the production of shaped articles containing polymerized acrylonitrile which have improved flexing and knotting characteristics.

A further object of the invention is to provide an improved process for making shaped articles containing polymerized acrylonitrile in which the heat shrinkage of the articles has been minimized.

Still another object of the invention is to provide an improved method for the production of polymerized acrylonitrile monofilaments of improved knot strength and minimized shrinkage.

Other objects and advantages of the present invention will be obvious to those skilled in the art especially after viewing the detailed disclosure herein.

This invention is concerned with an improved process for the production of a shaped synthetic resin article comprising a major portion of polymerized acrylonitrile by wet spinning into an aqueous bath and orientation of the coagulated article in which the length of the oriented article is contracted or relaxed at least 20% by heating with a substantial proportion of this relaxation being produced by heating while the article has an initial water content of at least about 9% of the total weight. Other aspects of the invention involve densifying the coagulated article by drying or dehydrating it prior to the orientation step, densifying or further densifying by drying the oriented article prior to the relaxing or contracting operation and a second contracting or postrelaxing the filament after it has been substantially completely dried. The invention accordingly comprises the aforesaid relaxing operation in combination with various combinations of one or more of the other steps named.

The present invention is applicable to a wide variety of synthetic resins containing a major portion or more than 50% polymerized acrylonitrile and in general it is recommended that the content of polymeric acrylonitrile amount to at least about 70% of the weight of the resin. Resins containing 85% or more of polymerized acrylonitrile are preferred in order to obtain the maximum benefits of the novel treatment. Thus, although the specific examples disclosed hereinbelow all relate to copolymers of 95% acrylonitrile and 5% methyl acrylate, in order to facilitate the comparison of the products of a process having a substantial number of variables, it is to be understood that the invention is not limited to copolymers of these two substances or of the stated proportions. Substantially any ethenoid monomer containing a $CH_2=C<$ group which is compatible with acrylonitrile during polymerization according to any known process for the polymerization of acrylonitrile may be used in making up the synthetic resins employed in the present invention. Copolymers of two or more of such monomers with acrylonitrile are also contemplated.

Illustrative examples of monomers which can be copolymerized or interpolymerized with acrylonitrile are the vinyl esters and especially the vinyl esters of saturated aliphatic monocarboxylic acids, e.g., vinyl acetate, vinyl propionate, vinyl butyrate, etc.; vinyl and vinylidene halides, e.g., the vinyl and vinylidene chlorides and fluorides; vinyl-substituted N-heterocyclic compounds, such as the vinyl pyridines, and especially 2-vinyl pyridine and 5-ethyl, 2-vinyl pyridine; allyl-type alcohols, e.g., allyl alcohol, methallyl alcohol and other unsaturated monohydric alcohols; allyl, methallyl and other unsaturated monohydric alcohol esters of monobasic acids, e.g., allyl and methallyl acetates, laurates, cyanides, etc.; acrylic and alkacrylic acids (e.g., methacrylic, ethacrylic, etc.) and esters and amides of such acids (e.g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons, e.g., isobutylene, isoprene, butadiene, etc.; styrene and substituted styrenes, for instance the methyl styrenes, etc.; and numerous other vinyl, acrylic and other compounds containing a single $CH_2=C<$ grouping which are copolymerizable with acrylonitrile to yield thermoplastic copolymers. Alkyl esters of alpha, beta-unsaturated polycarboxylic acids also can be copolymerized with acrylonitrile to form copolymers which can be used in practicing the present invention. Examples of such esters are the dimethyl, -ethyl, -propyl, -butyl, etc., esters of maleic, fumaric, citraconic, etc., acids.

The average molecular weight of polymers adapted for use in the instant process as determined by the Staudinger method described in U.S. Patent No. 2,404,713 may range between about 15,000 and about 300,000 and those between 40,000 and 140,000 are especially recommended.

For a better understanding of the nature and subject of the present invention, reference should be had to the accompanying drawings in which:

Fig. 1 is a flow sheet or schematic representation of the process of the present invention;

Fig. 2 is a graph showing the improvement in the knot strength of polymerized acrylonitrile monofilaments obtainable by the process of the present invention; and Fig. 3 is another graph depicting the relationship discovered between the moisture content of a wet-spun, oriented polymeric acrylonitrile monofilament and the ultimate relaxation or contraction upon heating to a suitable temperature.

As indicated hereinbelow, the process of the present invention has a number of modifications and the apparatus shown in the flow sheet may be used for carrying out any of these modifications simply by omitting, emptying or not heating certain units of the flow sheet. Stainless steel or other corrosion-resistant equipment is recommended throughout to avoid any discoloration of the monofilament.

Although the equipment mentioned hereinbelow is designed particularly for the manufacture of monofilaments, it will be understood that the present process is not limited to any particular apparatus and that it is intended to substitute other equipment known to those skilled in the art of suitable characteristics when producing such other shaped articles as sheets, moldings, etc.

Turning now to the flow sheet, a deaerated aqueous dope or spinning solution of polymeric acrylonitrile is admitted through line 1 to pump 2 which is provided with a variable speed drive (not shown). Pump 2 delivers dope at the selected rate into the pipe 3 having an orifice 4 at its end through which the dope is extruded into the coagulating bath 5 which consists of a 14% aqueous isopropanol solution maintained at from 0 to −5° C. Isopropanol is used as the freezing point depressant rather than sodium thiocyanate or other salts in order to obtain the maximum extraction of sodium thiocyanate from the relatively thick gel monofilament. The orifice 4 is immersed in the bath 5 and orifices of various diameters are used for different runs. The desired filament size is obtained by selection of the proper orifice size and by manipulation of the speed of pump 2 and/or pull-away roll 6 which also has a variable speed drive. The gel filament is carried around the rolls 6 and 7 for a total of 27 feet of travel through the coagulant and then passed into extraction baths 8 containing 5% isopropyl alcohol in water at about 0° C. where it is passed over power driven, grooved nylon rolls for a total travel of 92 feet in the two extraction baths. Next the filament is immersed in dye bath 9 and then in the wash bath 10 to remove solvent and excess dye. Where an undyed monofilament is desired either for sale as such or for dyeing in a subsequent operation, baths 9 and 10 may be either by-passed or simply drained.

Thereafter, the filament is optionally densified or dried to a moisture content of not less than 30% of the total weight of the filament on the pair of converging drying rolls 11 which are positively driven. The construction of these cylindrical rolls which are aligned with their axis about 12 inches apart and converging at an angle of about 0.6° is detailed in Cresswell Patent No. 2,558,734. By reason of the convergence of these rolls, which carry about 50 or 60 feet of monofilament in loops, the monofilament travels slowly across from one end to the other end of the rolls. The convergence does permit a very minor but negligible shrinkage in length of the filament; hence, the dehydration takes place under tension and without appreciable change in length. However, the drying of the filament does produce a substantial reduction in cross-section or a "densification" resulting in a thinner filament of higher density. Although air drying at room temperature with or without a fan or blower (not shown) will generally dehydrate the filament sufficiently, the rolls 11 are desirably provided with internal heating means for use under very difficult drying conditions. In this partial drying operation, it is important that the filament issuing from the rolls has a moisture content of at least about 30% by weight in order that the monofilament have all or a substantial part of its gel structure in order to permit orientation to the desired degree.

The orientation bath 12 is shown schematically for actually a unit of the type disclosed in Fig. 5 of Cresswell Patent No. 2,558,734 is recommended wherein the rolls 13 and 14 although not actually immersed in the bath of water maintained at 95° C. serve to support the filament which is submerged slightly. Here the monofilament is stretched to at least five times its original length by regulating the speed of roll 14 so that its linear circumferential speed is at least five times that of roll 13. Where any slippage of the filament on rolls is encountered here or in other stages of the process especially on rolls operating at increased or decreased speeds, the monofilament may be wrapped around the roll one or several times to eliminate the slippage.

After orientation the monofilament optionally passes to another densifying or partial dehydration step. Drying rolls 15 are of the same character as those rolls 11 discussed above and hold about 114 feet of the filament in loops. Like the rolls 11, in certain modifications of the novel process converging drying rolls 15 may also be either omitted or by-passed. During operations involving the use of rolls 15, their temperature is regulated between 20° and 90° C., 60° to 70° C. being the usual range, to reduce the moisture content of the monofilament to between 10.0 and 13.0% of the total weight. As in the densification mentioned above, the drying takes place under tension with no appreciable shrinkage in length, but there is a distinct densification due to the reduction in cross-section as the monofilament is partially dried.

Controlled relaxation or lengthwise shrinkage of the oriented monofilament under substantially no tension at a temperature above about 105° C. is the next operation. The relaxing unit 16 may be either a heated liquid bath about 19 inches long in a device similar to the orientation apparatus 12 or a small two-zone, electrically-heated furnace or oven about 28 inches long through which the monofilament passes. Where it is desired to use a temperature below about 170° a liquid bath is preferred for better heat transfer to the monofilament; but a furnace like that described in Cresswell Patent No. 2,558,733 is preferred for operations in which the relaxing zone will be maintained above about 170° C. In addition to baths and ovens, the relaxing may also be performed on 2 or more internally heated truncated conical or tapered rolls with the monofilament progressing from the wide toward the narrow ends of the rolls while it shrinks. Controlled contraction is obtained under substantially no tension other than the weight of a comparatively short section of the monofilament by reducing the speed of the exit roll 17 an appropriate amount in relation to the speed of entrance roll 18. For example, a filament of suitable characteristics may be relaxed 25 percent by operating roll 17 at a linear circumferential speed amounting to 75% of the linear circumferential speed of roll 18. Expressed another way, with rolls of the same diameter the speed of roll 17 should be adjusted to make 3 revolutions during a period while roll 18 makes 4 revolutions. Roll 18 is, of course, operated at a linear speed corresponding to the speed of the monofilament approaching from the previous processing step and roll 17 is independently driven by variable speed mechanism (not shown).

From the contracting or relaxing device, the filament next optionally is led into a wash tank 19 in which any liquid from the relaxing bath 16 which adheres to the filament is removed as the filament travels about 2 feet around the rolls in the wash tank. Of course, where an air oven is used as the relaxing unit 16, this piece of equipment may then be omitted from the process or the wash water drained therefrom.

In the next stage, the filament is dried to substantially complete dryness by repeatedly passing around the converging drying rolls 20 of similar construction to rolls 11 and 15. The rolls hold about 114 feet of monofilament in loops and are desirably subjected to graduated heating commencing with 90° C. at the starting ends and increasing to 120° C. at the other ends. As is apparent hereinafter, in certain variations of the process of the present invention, the drying rolls 20 may be bypassed or operated without heating. It should be noted that when these rolls are in operation the filament is under tension and, therefore, unable to shrink appreciably during drying as is the case with operations conducted on the drying rolls 11 and 15.

In the next stage of the operations, the completely dried filament is subjected in the relaxing unit 21 to another relaxing or contracting operation. The second relaxation operation is known as postrelaxation since it is performed upon a dry and apparently completed filament. In postrelaxing an air oven is usually preferred in order to avoid the retention of any bath liquid by the filament, thereby also obviating subsequent removal of such liquid. This zone is maintained at a temperature of at least about 150° C. and often temperatures of 200° C. or more are employed in contracting the dry monofilament. The shrinkages normally encountered in laundering and ironing are minimized or eliminated by the treatment which also increases knot strength where the first relaxation amounts to less than about 20% in length. As in the contracting or relaxing operation described earlier, the exit roll 22 is run at a lower linear circumferential speed than entrance roll 23 in order to permit the monofilament to shrink or contract under substantially no tension. The ratio between the linear circumferential speeds of these two rolls again corresponds to the percentage relaxation of the filament in this stage. After this, the filament is taken up on the power-driven bobbin 24. In certain variations of the present invention, postrelaxation is omitted and in others, where the filament comes out of the wash bath 19 with a water content of less than about 5%, both the drying on rolls 20 and the postrelaxing in unit 21 may be omitted.

Thus, the entire process comprises the following steps:

(1) The coagulation of the polymerized acrylonitrile dope as a gelatinous shaped article by means of an aqueous bath, preferably cooled to a temperature below 10° C.

(2) An optional though desirable washing of the extruded article in one or more baths to extract solvent and coagulating substances from the coagulated aquagel.

(3) An optional dyeing step while the article is in the gel state which is customarily followed by a wash bath.

(4) An optional densification or partial dehydration of the gelatinous material from about 80% moisture content to a water content of from about 30 to about 60% based on the total weight of the gelatinous mass.

(5) Orientation of the article by stretching the article while it still retains at least a substantial part of the gel structure.

(6) An optional densification or partial dehydration of the oriented material to a moisture content not less than about 9% of the total weight.

(7) A relaxing of the oriented article while heating to at least about 105° C. in an inert medium in order to substantially increase its flexing or knot strength. If a liquid heat transfer medium is employed, a subsequent washing in water is desirable to remove any residual liquid from the article.

(8) An optional drying operation in which the article is substantially completely dried by further heating.

(9) An optional postrelaxing or contracting by heating the substantially completely dried article under substantially no tension in a heated zone maintained at a temperature of at least about 150° C. This postrelaxing operation also stabilizes the article against shrinkage under elevated temperature conditions.

In certain modifications of the invention, the process can be terminated after the initial relaxation (7) except for storage of the article produced on bobbins or other suitable equipment inasmuch as the hot relaxation or contraction sometimes reduces the moisture content to as low as 1 to 3% especially where the oriented article is densified to a moisture content of less than 15% prior to the relaxing operation. In other variations, the processing is halted after drying (8) and the shaped article is stored in suitable manner.

The coagulation or spinning step is substantially that disclosed in U.S. Patent Nos. 2,558,730 and 2,558,733 wherein a water-coagulable aqueous salt solution of polymeric acrylonitrile is extruded into an aqueous coagulating bath which is preferably maintained below 10° C. The coagulant may be water but is preferably an aqueous solution containing from 3 to 25% by weight of an alcohol or one of the salts contained in the dope solvents described in Patent No. 2,558,733.

The extraction operation may consist of passing the article through a countercurrent series of washing or extraction baths of water or solutions containing suitable freezing point depressants such as an alcohol or a salt of the type suitable for use in the dope solvent, which baths are desirably maintained at atmospheric or lower temperatures. There are some indications that superior physical properties in the final article result from extraction in baths maintained between −5° and +5° C. Surprisingly, the amount of residual sodium thiocyanate or other salt in the article seems to have little effect on the flexibility or knotting characteristics of the product even when as much as 6.2% salt is present.

Although dyeing of the gelatinous article using dyes and techniques suitable for the dyeing of material containing a major portion of polymerized acrylonitrile is recommended over subsequent dyeing of the dried article, the specific details of dyeing form no part of the present invention and are therefore not described here.

The densification or partial drying of the article before the contracting or relaxing operation is highly desirable wherever dimensional stability of the product at elevated temperatures is important. This densification may take place in either of two stages or in both of them, subject to the limitations that the shaped article must contain at least 30% of moisture at the beginning of the orienting or stretching step and that the article must contain at least 9% moisture at the time it enters the relaxing unit. Where an article has been densified or dried to a water content below about 30%, it is no longer capable of stretching to the extent required without breaking. This is thought to be due to loss of gel structure since it is observed that the article shrinks considerably in cross-section during the partial dehydration operation. When the article is densified after orientation, it may be dehydrated to a greater degree, for example down to a moisture content of about 9 to 15% and preferably between 10 and 13% prior to the relaxing operation, for the reasons set forth below. Densifying at this point also appears to minimize residual shrinkage in the final article.

The present invention is not concerned with orientation per se and any method which is satisfactory for orienting an article containing a major portion of polymeric acrylonitrile may be employed. This step may be carried out by introducing the article, while it has a moisture content of at least 30% by weight, into contact with water or water vapor in a zone maintained at any suitable temperature wherein it is stretched to a length at least double and desirably 500% or more of its prior or coagulated length. So far the optimum results have been attained with 950 to 1200% orientation, but stretching to 2000% or more is also contemplated. Temperatures above 50° C. are generally preferred in the orientation zone and the 65 to 100° C. range is recommended for most purposes; however, any temperature may be used at which the filament will stretch under tension and at which there is no substantial blistering of the article or decomposition of the resin. The orientation conditions set forth in Cresswell et al. Patent No. 2,558,733 are especially adapted for use in the present process. Orientation has a great effect upon the tensile strength of the article but apparently much less if any effect upon the flexibility or knot strength. This operation dehydrates the gel article somewhat even though the article is submerged in water.

It has been discovered that with resins of the type disclosed herein coagulated in aqueous baths, the oriented shaped article must be relaxed or contracted at least 20% of the oriented length in order to procure good flexibility or knot strength in the product. This is apparent upon reference to Fig. 2 of the drawings wherein the knot strength remains substantially constant at a comparatively low value for relaxation ranging from 4 to 20% where the curve climbs sharply upwards. From this as well as the examples hereinbelow, it is evident that the relaxation of such articles should be at least 20% and preferably between about 25 and about 35%. Although, these higher relaxations often produce a lower tensile strength while greatly increasing the knot strength from a figure which is too low for most commercial purposes, the degree of shrinkage or relaxation can be readily adjusted to provide a filament of balanced physical properties including ample tensile strength.

It has also been found that the ultimate relaxation of which the article is capable is a function of the moisture content and this is shown by the curve in Fig. 3. As with much technical data, there are obviously small errors in the figures obtained in the experiments on which the curve is based; thus, the curve is the usual engineering approximation. Allowing for these discrepancies, it is judged that the initial moisture content of the monofilament should be at least about 9% and the preferred range of moisture content extends from about 10 to about 13% when the filament is subjected to densification in the oriented unrelaxed state. While the ultimate or maximum relaxation is obtained in most of the examples hereinbelow, it is to be understood that less relaxation may be employed provided that it amounts to about 20% or more of the oriented length. Further dehydration of the article occurs in the heated relaxing zone; hence, the above figures relate to initial moisture or water contents.

The minimum temperature at which the desired relaxation may be obtained with the resin used in the examples is 105° C. There is reason to believe that this is the minimum relaxation temperature for many other polymeric acrylonitriles of the type disclosed; however, it can be readily determined for any particular resin by simply observing the lowest temperature in a liquid bath at which an oriented sample shrinks when under no tension. It is usually desirable to maintain the relaxing unit at a temperature above this minimum in order to lower the dwell time therein. For example, at 105° C. the relaxing unit would be of an impractical length from a commercial standpoint especially where an air furnace with its lower heat transfer rate is employed. For a liquid bath, temperatures of 125° to 175° C. are recommended and this figure may be exceeded in the case of an air furnace which may be maintained at temperatures of from 150° to as high as about 300° C. or more since the oriented fiber will not attain any such temperature during the brief period of passage therethrough. A range of relaxation or contracting temperatures may be employed depending on the nature of the processing to which the monofilament is submitted both before and after this particular step. The limit to which the article may be heated is usually determined by the blistering of its surface due to the too rapid evolution of the water vapor from the interior. This effect apparently always occurs before there is any decomposition or thermal degradation of the resin which is, of course, also undesirable. The dwell or contact time may vary from 0.01 second to as much as 10 seconds depending on the extrusion rate, the temperature of the relaxing unit, the medium employed in the relaxing unit and other conditions such as the diameter and moisture content of the monofilament. Good results on monofilaments have been obtained with contact times of about 2 or 3 seconds. While longer and shorter relaxing unit should preferably be employed when the speed of travel of the article is increased or decreased respectively in order to maintain a constant contact time, it has been found that a considerable variation in this factor may exist. Those skilled in the art will have no difficulty in obtaining a proper balance between contact time and the temperature at which the relaxing zone is maintained.

The drying of the article which takes place in the heated relaxing unit 16 may be supplemented by substantially completely drying the material on suitable apparatus such as rolls 20. This is usually desirable where the water content is above .5% but is essential if a postrelaxing operation is to be carried out. Postrelaxing a dried shaped article will not alone achieve the results of the present invention; however, it may be used to supplement the initial relaxation of the moisture containing article. Thus, the article may be shrunk or relaxed less than 20% in the initial relaxing operation when a subsequent postrelaxing operation is employed to increase the total contraction to more than 20% of the oriented length. A substantial and preferably a major amount of the total relaxation should take place in the initial relaxing step, and the best results are obtained with 20% or more contraction there. In some circumstances it appears undesirable to have a total shrinkage or relaxation in excess of about 45%. Besides supplying in some instances a portion of the relaxation required for good flexing and knotting characteristics, this operation further stabilizes the product against shrinkage when exposed to elevated temperatures in the presence or absence of moisture.

An air oven is usually preferred for postrelaxing as higher temperatures are required in the case of a dried article. Thus the postrelaxing zone should be maintained at 150° C. or more and preferably above 180° C. up to say 500° C. or more where the residence time is very short. These figures will apply to many of the acrylonitrile polymers herein and the minimum temperature can be readily determined for any specific copolymer of acrylonitrile by simple and obvious experimentation. No difficulty is encountered with blistering of the surface in postrelaxing due to absence of water from the article; however, thermal degradation or decomposition of the resin from overheating must be avoided.

The examples tabulated below are intended to illustrate the various aspects of the present invention and are not intended as limitations thereon. To facilitate comparison of the results, a single copolymer of 95% acrylonitrile and 5% methyl acrylate was selected and dissolved in 50% aqueous sodium thiocyanate to a polymer concentration of 9.5% by weight. Three orifices having diameters of 52, 70 and 90 mils each were employed with the 52-mil diameter orifice being used for the majority of runs under coagulating conditions which varied only in regard to spinning rate. The spinning rate was adjusted by suitable manipulation of the delivery of pump 2 and the pull-away roll 6. The dyeing and washing operations were omitted in most of the examples for simplicity and most conditions were maintained as constant as readily possible while varying those set forth in the tables. For example, the only changes in the spinning and extraction operations were the designated changes in filament diameter and spinning rates for the composition of the dope and the baths was unchanged as was the length of travel in the baths. For all operations designated as drying, the filament was carried to substantially complete dryness under tension on rolls 20 which were internally heated to provide a temperature gradient of approximately 30° and a maximum roll temperature in the range 120° to 140° C. Examples designated below by letters A to ZZ, inclusive, rather than numerals are included only for purposes of comparison in order to demonstrate the unexpected results procured by the present invention. Unless otherwise indicated, all relaxing and postrelaxing steps at temperatures up to 170° C. were conducted in a bath of ethylene glycol or silicone oil, and an air furnace or oven was used for higher temperatures.

Table I

| Example | Final Filament Diameter, Mils | SPIN Orientation | | ORIENT Relaxation of Oriented Gel Maximum | | Post-Relaxation Maximum | | DRY Tensile, p.s.i. | Elongation, Percent | Knot, p.s.i. | POSTRELAX[1] Percent Shrinkage, 15 Min. at— | | Spinning Rate, Ft./Min. |
|---|---|---|---|---|---|---|---|---|---|---|---|---|---|
| | | Percent | °C. | Percent | °C. | Percent | °C. | | | | 100° C. | 170° C. | |
| A | 3.2 | 1,080 | 95 | | | | | 37,400 | 4.5 | 6,230 | 2.5 | 8.8 | 4.0 |
| B | 4.0 | 1,000 | 97 | | | | | 87,500 | 16.0 | 11,200 | 0.0 | 0.0 | 4.0 |
| C | 5.3 | 980 | 95 | | | | | 54,300 | 13.0 | 4,500 | 1.3 | 10.0 | 4.0 |
| D | 3.7 | 980 | 95 | | | | | 65,000 | 13.0 | 9,300 | 0.0 | 7.5 | 4.0 |
| E | 3.6 | 980 | 95 | | | | | 39,200 | 17.0 | 9,800 | 0.0 | 0.0 | 4.0 |
| F | 3.5 | 900 | 95 | | | | | 41,600 | 7.0 | 5,200 | 2.5 | 7.5 | 4.0 |
| G | 4.0 | 760 | 95 | | | | | 36,600 | 3.5 | 3,980 | 5.0 | 7.5 | 4.0 |
| H | 4.0 | 640 | 95 | | | | | 39,800 | 10.0 | 3,980 | 5.0 | 8.8 | 4.0 |
| I | 3.6 | 980 | 95 | | | 2 | 200 | 59,000 | 15.0 | 9,900 | 0.0 | 3.8 | 4.0 |
| J | 3.9 | 980 | 95 | | | 2 | 200 | 50,300 | 18.0 | 8,400 | 0.0 | 0.0 | 4.0 |
| K | 4.6 | 550 | 65 | | | 2 | 200 | 42,200 | 18.0 | 6,000 | 0.0 | 0.0 | 4.0 |
| L | 4.4 | 1,000 | 97 | | | 4 | >200 | 76,200 | 18.0 | 13,100 | 0.0 | 0.0 | 4.0 |
| M | 3.4 | 1,000 | 95 | | | 4 | 169 | 66,300 | 17.0 | 11,500 | | | 4.0 |
| N | 3.4 | 1,000 | 95 | | | 4 | 169 | 66,300 | 17.0 | 11,500 | | | 4.0 |
| O | 3.8 | 1,000 | 95 | | | <7 | 169 | 61,800 | 18.0 | 9,000 | | | 4.0 |
| P | 3.2 | 1,000 | 95 | | | 7 | 169 | 74,400 | 19.0 | 12,000 | | | 4.0 |
| Q | 4.1 | 980 | 95 | | | 7 | 200 | 53,000 | 22.0 | 7,600 | 0.0 | 1.3 | 4.0 |
| R | 4.7 | 550 | 65 | | | 7 | 200 | 46,500 | 22.5 | 5,750 | 0.0 | 0.0 | 4.0 |
| S | 3.5 | 1,000 | 95 | | | 9 | 169 | 63,900 | 19.0 | 9,200 | | | 4.0 |
| T | 3.6 | 1,000 | 95 | | | 10 | 169 | 70,900 | 20.0 | 9,100 | | | 4.0 |
| U | 3.7 | 1,000 | 95 | | | 14 | 169 | 56,400 | 22.0 | 9,000 | | | 4.0 |
| V | 4.7 | 550 | 65 | | | 14.5 | 200 | 34,600 | 19.5 | 11,500 | 0.0 | 0.0 | 4.0 |
| W | 3.9 | 980 | 95 | | | 15 | 200 | 58,500 | 25.0 | 8,400 | 0.0 | 0.0 | 4.0 |

[1] Only Examples I to W, inclusive, using air oven.

From the data in Table I above, it is apparent that low knot strengths are obtained with monofilaments spun into aqueous baths when the article is not relaxed; similarly, it is evident that postrelaxation of the drying monofilament up to 15%, the maximum obtainable, does not give adequate knot strength.

Table II

| Example | Final Filament Diameter, Mils | SPIN Orientation | | ORIENT Relaxation of Oriented Gel Maximum | | RELAX Post-Relaxation Maximum | | DRY Tensile, p.s.i. | Elongation, Percent | Knot, p.s.i. | Percent Shrinkage, 15 Min. at— | | Spinning Rate, Ft./Min. |
|---|---|---|---|---|---|---|---|---|---|---|---|---|---|
| | | Percent | °C. | Percent | °C. | Percent | °C. | | | | 100° C. | 170° C. | |
| 1 | 7.1 | 600 | 65 | [1]21 | 140 | | | 32,500 | 32.0 | 22,750 | 2.5 | 17.5 | 4.0 |
| 2 | 3.5 | 1,192 | 95 | 30 | 150 | | | 54,100 | 23.5 | 39,300 | 0.0 | 1.3 | 4.0 |
| 3 | 4.4 | 1,000 | 95 | 30 | 155 | | | 39,400 | 28.5 | 19,700 | 5.0 | 11.3 | 4.0 |
| 4 | 3.4 | 1,000 | 95 | 30 | 155 | | | 55,000 | 22.5 | 33,000 | 7.5 | 12.5 | 4.0 |
| 5 | 4.1 | 1,000 | 95 | 30 | 155 | | | 45,500 | 33.0 | 37,800 | 5.0 | 10.0 | 4.0 |

[1] Not maximum relaxation.

Table II demonstrates the advantages secured with the present invention when the gel filament is relaxed more than 20% in the wet gel or undensified condition. While shrinkage of the product under heat aging is excessive for some purposes, it still is superior to some commercial monofilaments.

Table III

| | | SPIN | | ORIENT | | RELAX | | DRY | | | POSTRELAX | | |
|---|---|---|---|---|---|---|---|---|---|---|---|---|---|
| Example | Final Filament Diameter, Mils | Orientation | | Relaxation of Oriented Gel Maximum | | Post-Relaxation Maximum | | Tensile, p.s.i. | Elongation, Percent | Knot, p.s.i. | Percent Shrinkage, 15 Min. at— | | Spinning Rate, Ft./Min. |
| | | Percent | °C. | Percent | °C. | Percent | °C. | | | | 100° C. | 170° C. | |
| 6 | 5.2 | 1,000 | 97 | 27 | 140 | 9 | >200 | 56,600 | 40.0 | 34,400 | 0.0 | 5.0 | 4.0 |
| 7 | 4.1 | 1,192 | 95 | 27 | 150 | 7 | >200 | 45,500 | 33.9 | 45,500 | 0.0 | 1.3 | 4.0 |

The effect of a postrelaxing operation in Examples 6 and 7 in minimizing residual shrinkage is evident from comparison with the results in the examples of Table II.

subsequent wash bath is less than about 3%, no further drying of the filament is required for many uses. The critical effect on the knot strength of relaxing the fiber

Table IV

| | | SPIN | | ORIENT | | DENSIFY[1] | | RELAX | | | | | |
|---|---|---|---|---|---|---|---|---|---|---|---|---|---|
| Example | Final Filament Diameter, Mils | Orientation | | Relaxation Maximum | | Post-Relaxation Maximum | | Tensile, p.s.i. | Elongation, Percent | Knot, p.s.i. | Percent Shrinkage, 15 Min. at— | | Spinning Rate, Ft./Min. |
| | | Percent | °C. | Percent | °C. | Percent | °C. | | | | 100° C. | 170° C. | |
| X | 4.3 | 760 | 95 | 16 | 175 | | | 48,300 | 23.0 | 6,900 | 0.0 | 0.0 | 4.0 |
| Y | 4.6 | 640 | 95 | 16 | 175 | | | 42,200 | 22.5 | 6,030 | 0.0 | 0.0 | 4.0 |
| Z | 5.2 | 550 | 65 | 17 | 200 | | | 37,800 | 25.5 | 9,400 | 0.0 | 0.0 | 4.0 |
| AA | 3.9 | 980 | 95 | 17 | 180 | | | 50,300 | 24.0 | 8,400 | 0.0 | 0.0 | 4.0 |
| BB | 3.8 | 1,000 | 95 | 17 | 169 | | | 62,000 | 22.0 | 8,000 | | | 4.0 |
| CC | 4.5 | 980 | 95 | 18 | 155 | | | 39,600 | 26.0 | 9,400 | 0.0 | 0.0 | 4.0 |
| DD | 3.9 | 900 | 95 | 18 | 170 | | | 50,200 | 23.0 | 8,350 | 0.0 | 0.0 | 4.0 |
| EE | 5.3 | 550 | 65 | 19 | 200 | | | 36,200 | 26.0 | 9,000 | 0.0 | 0.0 | 4.0 |
| FF | 3.4 | 1,000 | 95 | 19 | 169 | | | 77,100 | 25.0 | 11,500 | | | 4.0 |
| 8 | 4.1 | 980 | 95 | 23 | 200 | | | 37,900 | 24.0 | 30,300 | 0.0 | 0.0 | 4.0 |
| 9 | 4.9 | 980 | 95 | 23 | 200 | | | 58,300 | 31.0 | 37,100 | 0.0 | 0.0 | 4.0 |
| 10 | 3.0 | 1,190 | 95 | 23 | 170 | | | 70,700 | 26.0 | 28,300 | 0.0 | 0.0 | 4.0 |
| 11 | 4.1 | 1,000 | 95 | 25 | 169 | | | 53,000 | 31.0 | 38,000 | 0.0 | 1.3 | 4.0 |
| 12 | 3.7 | 980 | 95 | 28 | 170 | | | 46,500 | 23.0 | 37,200 | 0.0 | 2.5 | 4.0 |
| 13 | 4.4 | 1,000 | 95 | 28 | 169 | | | 39,800 | 30.0 | 33,000 | | | 4.0 |
| 14[2] | 4.4 | 1,000 | 95 | 29 | 163 | | | 46,000 | 35.5 | 21,700 | 0.0 | 0.0 | 4.0 |
| 15[3] | 4.4 | 1,000 | 95 | 29 | 161 | | | 42,100 | 34.0 | 37,700 | 2.5 | 2.5 | 4.0 |
| 16 | 4.3 | 980 | 95 | 30 | 168 | | | 41,400 | 36.0 | 34,400 | 0.0 | 0.0 | 4.0 |
| 17 | 3.6 | 1,000 | 95 | 30 | 165 | | | 59,800 | 30.0 | 49,300 | 0.0 | 1.3 | 4.0 |
| 18 | 5.5 | 640 | 68 | 30 | >200 | | | 33,800 | 31.3 | 21,100 | 0.0 | 0.0 | 4.0 |
| 19 | 4.0 | 1,000 | 95 | 32 | 169 | | | 47,700 | 34.0 | 47,700 | | | 4.0 |
| 20 | 4.6 | 1,000 | 95 | 37 | 169 | | | 23,900 | 32.0 | 23,900 | | | 4.0 |
| 21 | 4.4 | 1,000 | 95 | 39 | 169 | | | 36,300 | 27.0 | 19,600 | | | 4.0 |

[1] Oriented gel filaments were dehydrated to various moisture contents between about 9 and about 15% by weight before relaxation.
[2] Filament dyed red prior to orientation in Example 14.
[3] Filament dyed yellow prior to orientation in Example 15.

The unexpected improvement produced by the present process is again apparent upon comparison of the numerical examples in Table IV with those in Table I. Here, the monofilament is densified to a moisture content between 9 and 15% after orientation and before relaxation. Since it is found that the moisture content of the filament emerging from the relaxing unit and any subsequent wash bath is less than about 3%, no further drying of the filament is required. The very considerable reduction in residual shrinkage over the values set forth in Table III and especially those in Table II is attributed to the step of densifying before relaxing.

at least about 20% is illustrated by contrasting the numerical examples with the lettered examples in Table IV.

Table V

| | | SPIN | | DENSIFY[1] | | ORIENT | | DRY | | | POSTRELAX[2] | | |
|---|---|---|---|---|---|---|---|---|---|---|---|---|---|
| Example | Final Filament Diameter, Mils | Orientation | | Relaxation of Oriented Gel Maximum | | Post-Relaxation Maximum | | Tensile, p.s.i. | Elongation, Percent | Knot, p.s.i. | Percent Shrinkage, 15 Min. at— | | Spinning Rate, Ft./Min. |
| | | Percent | °C. | Percent | °C. | Percent | °C. | | | | 100° C. | 170° C. | |
| GG | 2.7 | 1,190 | 95 | | | | | 35,000 | 2.0 | nil | 0.0 | 2.5 | 4.0 |
| HH | 5.8 | 1,000 | 97 | | | | | 45,500 | 18.0 | 3,400 | 0.0 | 2.5 | 4.0 |
| II | 5.9 | 1,000 | 97 | | | | | 38,800 | 11.0 | 4,400 | 0.0 | 1.9 | 4.0 |
| JJ | 6.3 | 1,000 | 97 | | | | | 41,800 | 13.0 | 3,200 | 0.0 | 5.0 | 8.0 |
| KK | 3.9 | 980 | 97 | | | | | 50,300 | 15.1 | 8,400 | 1.3 | 5.0 | 12.0 |
| LL | 6.3 | 800 | 97 | | | | | 40,200 | 12.0 | 4,180 | 0.0 | 3.8 | 4.0 |
| MM | 6.8 | 700 | 97 | | | | | 40,000 | 16.0 | 4,400 | 0.0 | 2.5 | 4.0 |
| NN | 7.2 | 600 | 97 | | | | | 37,600 | 17.0 | 4,430 | 0.0 | 2.5 | 4.0 |
| OO | 7.8 | 480 | 97 | | | | | 34,900 | 19.0 | 4,400 | 0.0 | 2.5 | 4.0 |
| PP | 7.2 | 600 | 65 | | | | | 37,600 | 16.0 | 3,900 | 0.0 | 2.5 | 4.0 |
| QQ | 8.1 | 480 | 97 | | | 2 | >200 | 32,300 | 25.5 | 6,600 | 0.0 | 0.0 | 4.0 |
| RR | 6.6 | 800 | 97 | | | 4 | >200 | 40,500 | 21.5 | 6,150 | 0.0 | 0.0 | 4.0 |
| SS | 7.4 | 600 | 65 | | | 4 | >200 | 37,900 | 23.5 | 6,300 | 0.0 | 0.0 | 4.0 |
| TT | 6.1 | 1,000 | 97 | | | 7 | >200 | 44,300 | 23.5 | 6,100 | 0.0 | 0.0 | 4.0 |
| UU | 6.2 | 1,000 | 97 | | | 7 | >200 | 41,100 | 20.0 | 6,300 | 0.0 | 0.0 | 4.0 |
| VV | 7.1 | 700 | 97 | | | 7 | >200 | 36,200 | 21.0 | 12,150 | 0.0 | 0.0 | 4.0 |
| WW | 7.5 | 600 | 97 | | | 7 | >200 | 26,800 | 16.5 | 9,300 | 0.0 | 0.0 | 4.0 |
| XX | 6.9 | 980 | 95 | | | 8 | >200 | 50,800 | 21.5 | 5,350 | 0.0 | 0.0 | 8.0 |

[1] Gel filament dehydrated from about 80% to 31 to 46% moisture content before orientation.
[2] Only Examples QQ to XX, inclusive, using air oven.

The examples in Table V are not within the scope of the present invention. They show that densification alone prior to orientation produces poorer physical properties than were obtained in the examples of Table I both in the case of unrelaxed fibers and those subjected to a moderate degree of postrelaxing.

length of bath 16, nothing compensates for the poorer heat transfer to the interior of the thicker filaments or that resulting from the decreased residence time caused by the higher rate of travel.

Table VII

| | SPIN | DENSIFY[1] | | ORIENT | | | | RELAX | DRY | | POSTRELAX | | |
|---|---|---|---|---|---|---|---|---|---|---|---|---|---|
| Example | Final Filament Diameter, Mils | Orientation | | Relaxation of Oriented Gel Maximum | | Post Relaxation Maximum | | Tensile, p.s.i. | Elongation, Percent | Knot, p.s.i. | Percent Shrinkage, 15 Min. at— | | Spinning Rate, Ft./Min. |
| | | Percent | °C. | Percent | °C. | Percent | °C. | | | | 100°C. | 170°C. | |
| ZZ | 8.0 | 980 | 95 | 9 | 145 | 7 | >200 | 33,800 | 24.0 | 6,000 | 1.3 | 6.3 | 8.0 |
| 37 | 8.4 | 980 | 95 | 9 | 145 | 17 | >200 | 30,700 | 34.0 | 20,200 | 0.0 | 5.0 | 8.0 |
| 38 | 5.2 | 980 | 95 | 15 | 157 | 15 | 185 | 23,600 | 39.0 | 18,800 | 0.0 | 7.5 | 12.0 |
| 39 | 6.6 | 980 | 95 | 20 | 154 | 2 | >200 | 29,300 | 35.0 | 20,500 | 1.3 | 11.2 | 12.0 |
| 40 | 6.7 | 980 | 97 | 25 | 154 | 2 | >200 | 28,400 | 39.0 | 25,600 | 1.3 | 7.5 | 12.0 |
| 41 | 6.5 | 1,000 | 97 | 27 | 140 | 2 | >200 | 39,800 | 33.0 | 25,100 | 0.0 | 0.0 | 4.0 |
| 42 | 9.0 | <550 | 65 | 27 | 140 | 3 | >200 | 26,900 | 28.0 | 24,800 | 0.0 | 0.0 | 4.0 |
| 43 | 6.6 | 1,000 | 97 | 28 | 140 | 2 | >200 | 43,600 | 37.0 | 28,100 | 0.0 | 1.3 | 4.0 |
| 44 | 4.3 | 1,192 | 95 | 30 | 150 | 3 | 190–300 | 48,300 | 33.0 | 41,300 | 0.0 | 0.0 | 4.0 |
| 45 | 4.6 | 1,192 | 95 | 30 | 150 | 15 | 190–300 | 30,100 | 24.0 | 30,100 | 0.0 | 0.0 | 4.0 |
| 46 | 6.4 | 1,000 | 97 | 30 | 140 | 2 | >200 | 43,600 | 31.0 | 21,500 | 0.0 | 0.0 | 4.0 |
| 47 | 4.5 | 980 | 95 | 30 | 143 | 2 | >200 | 48,200 | 30.0 | 32,500 | 0.0 | 0.0 | 4.0 |
| 48 | 4.7 | 980 | 95 | 30 | 144 | 2 | >200 | 46,300 | 16.0 | 28,900 | 0.0 | 0.0 | 4.0 |
| 49 | 9.4 | 980 | 95 | 30 | 145 | 3 | >200 | 28,800 | 45.0 | 21,600 | 1.9 | 5.2 | 8.0 |
| 50 | 5.1 | 980 | 95 | 30 | 150 | 15 | 190–300 | 29,300 | 27.0 | 24,400 | 0.0 | 0.0 | 4.0 |
| 51 | 5.6 | 980 | 95 | 30 | 145 | 17 | 185 | 20,300 | 51.0 | 20,300 | 0.0 | 6.3 | 12.0 |
| 52 | 5.7 | 1,000 | 97 | 32 | 144 | 3 | >200 | 38,000 | 31.5 | 27,500 | 0.0 | 1.3 | 4.0 |
| 53 | 8.7 | 600 | 65 | 32 | 140 | 8 | >200 | 27,000 | 33.0 | 24,700 | 0.0 | ------ | 4.0 |
| 54 | 8.1 | 1,100 | 95 | >32 | 135 | 7 | >200 | 42,700 | 28.2 | 23,300 | 0.0 | 2.5 | 4.0 |
| 55 | 4.2 | 1,192 | 95 | 37 | 150 | 2 | >200 | 58,000 | 21.0 | 21,700 | 0.0 | 2.5 | 4.0 |
| 56 | 4.0 | 1,100 | 95 | 37 | 150 | 2 | >200 | 55,700 | 19.7 | 31,800 | 0.0 | 0.0 | 4.0 |

[1] Gel filament was dehydrated from about 80 to about 31 to 46% moisture content before orientation.

The operating conditions in Table VII correspond generally to those in Table VI and illustrate the lower re-

Table VI

| | SPIN | DENSIFY[1] | | ORIENT | | | | RELAX | DRY | | |
|---|---|---|---|---|---|---|---|---|---|---|---|
| Example | Final Filament Diameter, Mils | Orientation | | Relaxation of Oriented Gel Maximum | | Post-Relaxation Maximum | | Tensile, p.s.i. | Elongation, Percent | Knot, p.s.i. | Percent Shrinkage, 15 Min. at— | | Spinning Rate, Ft./Min. |
| | | Percent | °C. | Percent | °C. | Percent | °C. | | | | 100°C. | 170°C. | |
| YY | 7.7 | 600 | 75 | <20 | 140 | | | 34,400 | 22.0 | 8,400 | 0.0 | 3.8 | 4.0 |
| 22 | 6.3 | 980 | 95 | 20 | 154 | | | 32,100 | 30.8 | 9,300 | 1.3 | 13.8 | 12.0 |
| 23 | 6.5 | 980 | 95 | 25 | 154 | | | 33,200 | 33.5 | 24,200 | 2.5 | 15.0 | 12.0 |
| 24 | 7.2 | 800 | 97 | 25 | 140 | | | 37,800 | 27.8 | 18,900 | 0.0 | 2.5 | 4.0 |
| 25 | 6.8 | 1,000 | 97 | 28 | 140 | | | 44,000 | 36.5 | 28,200 | 0.0 | 2.5 | 4.0 |
| 26 | 4.0 | 1,192 | 95 | 30 | 150 | | | 63,800 | 26.8 | 39,900 | 0.0 | 2.5 | 4.0 |
| 27 | 6.6 | 1,000 | 97 | 30 | 140 | | | 42,200 | 32.5 | 20,200 | 0.0 | 2.5 | 4.0 |
| 28 | 4.3 | 980 | 95 | 30 | 140 | | | 52,000 | 30.0 | 36,200 | 0.0 | 2.5 | 4.0 |
| 29 | 4.4 | 980 | 95 | 30 | 153 | | | 43,600 | 23.0 | 32,000 | 0.0 | 2.5 | 8.0 |
| 30 | 8.2 | 980 | 95 | 30 | 145 | | | 41,400 | 31.5 | 19,000 | 1.3 | 5.0 | 4.0 |
| 31 | 9.0 | 980 | 95 | 30 | 145 | | | 28,400 | 35.5 | 20,500 | 3.8 | 8.8 | 8.0 |
| 32 | 6.7 | 980 | 95 | 30 | 154 | | | 31,200 | 41.0 | 22,700 | 2.5 | 13.7 | 12.0 |
| 33 | 5.0 | 980 | 97 | 30 | 145 | | | 37,300 | 28.5 | 19,900 | 1.3 | 11.3 | 12.0 |
| 34 | 6.2 | 1,000 | 95 | 32 | 140 | | | 36,500 | 33.0 | 19,300 | 0.0 | 2.5 | 4.0 |
| 35 | 5.5 | 1,000 | 97 | 32 | 144 | | | 43,300 | 29.0 | 35,800 | 0.0 | 3.8 | 4.0 |
| 36 | 8.2 | 600 | 65 | 32 | 140 | | | 32,300 | 37.0 | 20,400 | 0.0 | 2.5 | 4.0 |

[1] Gel filament was dehydrated from about 80% to 31 to 46% moisture content before orientation.

Except for comparative Example YY, the examples in Table VI demonstrate improved characteristics produced by the present invention over those in Table V. The Table VI examples are also comparative to those in Table II and illustrate the improvement in product shrinkage characteristics which are brought about by densification prior to orientation. In this comparison, allowance should be made for certain examples in Table VI wherein either a higher spinning speed or a thicker monofilament or both are employed. With no increase in the sidual shrinkage brought about by adding a postrelaxing step to the process. Here as in Table VI, a striking reduction in knot strength is observed in the single comparative example wherein the total relaxation or contraction amounts to less than about 20%. As the total relaxation increases, the knot strength continues to rise and the tensile strength continues to fall until a common level is reached. Accordingly, by controlling the degree of relaxation in the present process, the operator can select and balance the desired physical characteristics in the shaped article to a considerable extent.

Table VIII

| | SPIN | DENSIFY[1] | | ORIENT | | DENSIFY[2] | | RELAX | | | | | |
|---|---|---|---|---|---|---|---|---|---|---|---|---|---|
| Example | Final Filament Diameter, Mils | Orientation | | Relaxation Maximum | | Post-Relaxation Maximum | | Tensile, p.s.i. | Elongation, Percent | Knot, p.s.i. | Percent Shrinkage, 15 Min. at— | | Spinning Rate, Ft./Min. |
| | | Percent | °C. | Percent | °C. | Percent | °C. | | | | 100°C. | 170°C. | |
| 57 | 4.1 | 1,000 | 95 | 27 | 168 | | | 53,000 | 36.5 | 37,800 | 0.0 | 0.0 | 4.0 |
| 58 | 4.1 | 1,000 | 95 | 27 | 168 | | | 45,500 | 34.0 | 30,300 | 0.0 | 6.3 | 4.0 |
| 59 | 4.2 | 1,000 | 95 | 27 | 168 | | | 43,300 | 32.0 | 21,600 | 0.0 | 0.0 | 4.0 |
| 60 | 4.1 | 1,000 | 95 | 29 | 168 | | | 53,000 | 39.0 | 37,800 | 0.0 | 0.0 | 4.0 |
| 61 | 4.4 | 1,000 | 95 | 30 | 168 | | | 39,400 | 33.0 | 19,700 | 0.0 | 2.5 | 4.0 |

[1] Gel filament was dehydrated from about 80% to 31 to 46% moisture content before orientation.
[2] Oriented filament was further dehydrated to about 10 to 12% moisture content after orientation and before relaxation.

In comparison with Table V, the examples in the table immediately above shown the great improvement in knot strength and heat shrinkage of the product which is produced by another modification of the invention in which the monofilament is densified after orientation as well as before.

Since certain changes will be made in carrying out the process of the present invention, it is intended that all matter contained in the above description shall be interpreted as illustrative and that the invention is to be limited only by the following claims which are intended to cover all the generic and specific features herein described.

We claim:

1. In the production of a shaped synthetic resin article comprising at least 50 percent by weight of polymerized acrylonitrile by a process including coagulating a solution of the resin to a shaped aquagel article in an aqueous bath and stretching the coagulated article to at least twice its length, the method which comprises contracting the length of the stretched article at least about 20 percent by heating, at least a substantial portion of said contraction being produced by heating while the article has an initial water content of at least about 9.0 percent of the total weight.

2. In the production of a shaped synthetic resin article comprising at least 50 percent by weight of polymerized acrylonitrile by a process including coagulating a solution of the resin to a shaped aquagel article in an aqueous bath and stretching the coagulated article to at least twice its length, the steps which comprise densifying the coagulated article by partially drying without substantial change in length to a moisture content below 60 percent of the total weight, and thereafter contracting the length of the stretched article at least about 20 percent by heating, at least a substantial portion of said contraction being produced by heating while the article has an initial water content of at least about 9 percent of the total weight.

3. In the production of a shaped synthetic resin article comprising at least 50 percent by weight of polymerized acrylonitrile by a process including coagulating a solution of the resin to a shaped aquagel article in an aqueous bath and stretching the coagulated article to at least twice its length, the steps which comprise contracting the length of the stretched article substantially by heating while the article has an initial water content of at least about 9 percent of the total weight, drying the contracted article and further contracting the length of the dried article by heating, the total contraction amounting to at least 20 percent of the stretched length of the article.

4. In the production of a shaped synthetic resin article comprising at least 50 percent by weight of polymerized acrylonitrile by a process including coagulating a solution of the resin to a shaped aquagel article in an aqueous bath and stretching the coagulated article to at least twice its length, the steps which comprise densifying the coagulated article by partially drying without substantial change in length to a moisture content below about 60 percent of the total weight, thereafter substantially contracting the length of the stretched article by heating while the article has an initial water content of at least about 9 percent of the total weight, drying the contracted article and further contracting the length of the dried article by heating, the total contraction amounting to at least 20 percent of the stretched length of the article.

5. In the production of a shaped synthetic resin article comprising at least 50 percent by weight of polymerized acrylonitrile by a process including coagulating a solution of the resin to a shaped aquagel article in an aqueous bath and stretching the coagulated article, the steps which comprise densifying the coagulated article before stretching by partially drying without substantial change in length to a moisture content between about 30 and about 50 percent of the total weight, stretching the densified article to at least twice its length, contracting the length of the stretched densified article between about 25 and about 35 percent by heating in a zone maintained between about 125 and about 175 degrees centigrade while the densified article has an initial water content of at least about 10 percent of the total weight and drying the contracted article.

6. In the production of a shaped synthetic resin article comprising at least 50 percent by weight of polymerized acrylonitrile by a process including coagulating a solution of the resin to a shaped aquagel article in an aqueous bath and stretching the coagulated article to at least twice its length, the steps which comprise densifying the coagulated article before stretching by partially drying without substantial change in length to a moisture content between about 30 and about 50 percent of the total weight, stretching the densified article, contracting the length of the stretched article substantially by heating in a zone maintained between about 125 and about 175 degrees centigrade while the densified article has an initial water content of at least about 10 percent of the total weight, drying the contracted article and further contracting the dried article by heating in a zone maintained above about 150 degrees centigrade, said total contraction amounting to at least 25 percent of the stretched length of the article.

7. A process according to claim 1 in which the synthetic resin comprises at least about 85 percent polymerized acrylonitrile and the operations are carried out in a continuous manner.

8. A process according to claim 4 in which the synthetic resin is a copolymer of methyl acrylate and at least 90 percent acrylonitrile and in which the article is heated above about 105 degrees centigrade in each of said contracting steps.

9. In the production of a shaped synthetic resin article comprising at least 50 percent by weight of polymerized acrylonitrile by a process including coagulating a solution of the resin to a shaped aquagel article in an aqueous bath and stretching the coagulated article to at least twice its length, the steps which comprise densifying the stretched article by partially drying without substantial change in length to a moisture content between about 9 and about 15 percent of the total weight and contracting the length of the densified article at least about 25 percent by heating in a zone maintained at a temperature above about 150 degrees centigrade.

10. In the production of a shaped synthetic resin article comprising at least 50 percent by weight of polymerized acrylonitrile by a process including coagulating a solution of the resin to a shaped aquagel article in an aqueous bath and stretching the coagulated article to at least twice its length, the steps which comprise densifying the stretched article by partially drying without substantial change in length to a water content between about 9 and about 15 percent of the total weight, substantially contracting the length of the densified article by heating in a zone maintained at a temperature of at least about 150 degrees centigrade, substantially completely drying the contracted article, and further contracting the length of the dried article by heating, the total contraction amounting to at least 20 percent of the oriented length of the article.

11. In the production of a shaped synthetic resin article comprising at least 50 percent by weight of polymerized acrylonitrile by a process including coagulating a solution of the resin to a shaped aquagel article in an aqueous bath and stretching the coagulated article to at least twice its length, the steps which comprise densifying the coagulated article by partial drying without substantial change in length to a moisture content between about 30 and about 60 percent of the total weight, stretching the densified article, further densifying the stretched article by partial drying without substantial change in length to a moisture content between about 9 and about 15 percent of the total weight, and contracting the length of the stretched densified article at least about 25 percent by heating.

12. In the production of a shaped synthetic resin article comprising at least 50 percent by weight of polymerized acrylonitrile by a process including coagulating a solution of the resin to a shaped aquagel article in an aqueous bath and stretching the coagulated article to at least twice its length, the steps which comprise densifying the coagulated article by partially drying without substantial change in length to a moisture content between about 30 and about 60 percent of the total weight, stretching the densified article, further densifying the stretched article by partial drying without substantial change in length to a moisture content between about 9 and about 15 percent of the total weight, and contracting the length of the stretched densified article at least about 20 percent by heating, substantially completely drying the contracted article, and further contracting the dried article by heating, the total contraction amounting to less than about 45 percent of the stretched length of the article.

13. A process according to claim 4 in which the synthetic resin is a copolymer of acrylonitrile and a vinyl pyridine and in which the article is heated above about 105 degrees centigrade in each of said contracting steps.

14. A process according to claim 4 in which the synthetic resin is a copolymer of acrylonitrile, vinyl acetate and a vinyl pyridine and in which the article is heated above about 105 degrees centigrade in each of said contracting steps.

References Cited in the file of this patent

UNITED STATES PATENTS

| | | |
|---|---|---|
| 2,140,048 | Fikentscher | Dec. 13, 1938 |
| 2,140,921 | Rein | Dec. 20, 1938 |
| 2,199,411 | Lewis | May 7, 1940 |
| 2,404,714 | Latham | July 23, 1946 |
| 2,420,565 | Rugeley et al. | May 13, 1947 |
| 2,445,042 | Silverman | July 13, 1948 |
| 2,451,420 | Watkins | Oct. 12, 1948 |
| 2,558,730 | Cresswell | July 3, 1951 |
| 2,558,731 | Cresswell | July 3, 1951 |
| 2,558,732 | Cresswell | July 3, 1951 |
| 2,558,733 | Cresswell | July 3, 1951 |
| 2,558,734 | Cresswell | July 3, 1951 |
| 2,558,735 | Cresswell | July 3, 1951 |
| 2,692,185 | Hooper et al. | Oct. 19, 1954 |

UNITED STATES PATENT OFFICE

CERTIFICATE OF CORRECTION

Patent No. 2,883,260                                                             April 21, 1959

James A. Melchore et al.

It is hereby certified that error appears in the printed specification of the above numbered patent requiring correction and that the said Letters Patent should read as corrected below.

Columns 11 and 12, Table IV, under the heading "Tensile, p.s.i.", last figure thereof, for "36,300" read -- 26,300 --; columns 13 and 14, Table VI, under the heading "Knot, p.s.i.", second figure thereof, for "9,300" read -- 19,300 --; column 16, lines 14 and 15, strike out "to at least twice its length" and insert the same after "article" and before the comma, in line 19, same column; lines 69 and 70, strike out "to at least twice its length" and insert the same after "article" and before the comma, in line 74, same column 16; column 17, lines 9 and 10, strike out "to at least twice its length" and insert the same after "article" and before the comma, in line 14, same column 17.

Signed and sealed this 8th day of September 1959.

(SEAL)
Attest:
KARL H. AXLINE
Attesting Officer                                              ROBERT C. WATSON
                                                                                   Commissioner of Patents